US007945896B2

(12) United States Patent
Rousselle

(10) Patent No.: US 7,945,896 B2
(45) Date of Patent: May 17, 2011

(54) IMPLEMENTING REQUEST/REPLY PROGRAMMING SEMANTICS USING PUBLISH/SUBSCRIBE MIDDLEWARE

(75) Inventor: Philip Rousselle, Austin, TX (US)

(73) Assignee: Inceptia LLC, Brooklyn, NY (US)

( * ) Notice: Subject to any disclaimer, the term of this patent is extended or adjusted under 35 U.S.C. 154(b) by 1132 days.

(21) Appl. No.: 10/672,795

(22) Filed: Sep. 26, 2003

(65) Prior Publication Data
US 2004/0064821 A1    Apr. 1, 2004

Related U.S. Application Data

(60) Provisional application No. 60/414,369, filed on Sep. 30, 2002.

(51) Int. Cl.
G06F 9/44 (2006.01)
G06F 9/46 (2006.01)
G06F 15/16 (2006.01)
(52) U.S. Cl. ......... 717/116; 719/315; 719/330; 709/201
(58) Field of Classification Search .......................... None
See application file for complete search history.

(56) References Cited

U.S. PATENT DOCUMENTS

| 6,021,443 | A | 2/2000 | Bracho et al. | |
| 6,154,781 | A | 11/2000 | Bolam et al. | |
| 6,189,045 | B1 | 2/2001 | O'Shea et al. | |
| 6,643,682 | B1 * | 11/2003 | Todd et al. | 709/202 |
| 6,772,216 | B1 * | 8/2004 | Ankireddipally et al. | 709/230 |
| 6,779,184 | B1 * | 8/2004 | Puri et al. | 719/315 |
| 6,804,818 | B1 * | 10/2004 | Codella et al. | 719/315 |
| 6,915,519 | B2 * | 7/2005 | Williamson et al. | 719/313 |
| 7,051,118 | B2 * | 5/2006 | Collison | 709/246 |
| 7,152,094 | B1 * | 12/2006 | Jannu et al. | 709/206 |
| 2002/0116205 | A1 | 8/2002 | Ankireddipally et al. | |
| 2003/0014532 | A1 * | 1/2003 | Chang et al. | 709/231 |
| 2003/0135556 | A1 * | 7/2003 | Holdsworth | 709/206 |
| 2004/0019645 | A1 * | 1/2004 | Goodman et al. | 709/206 |

OTHER PUBLICATIONS

IBM, "A mechanism for inter-object communication using publish/subscribe messaging," Ip.com, 17 Aug. 2004, pp. 1-5.*
Terry, S.; Enterprise JMS Programming, 2002, pp. cover, 87-89, 132-134, 271-291 MaT Books, NY, U.S.A.;.
Rousselle, P.; Implementing the JMS Publish/Subscribe API; Dr. Dobb's Journal, San Mateo, CA, U.S.A.; Apr. 2002, pgs. 28, 30-32.
Java Message Service (JMS) for J2EE, 1st Edition, Aug. 2002; New Riders Publishing, pp. cover p., 257-275.

* cited by examiner

Primary Examiner — Michael J Yigdall

(57) ABSTRACT

A request/reply middleware wrapper that transposes an application's request/reply communications into publish/subscribe communications implemented by publish/subscribe middleware where every distributed application component of a distributed application is referenced by a component type and name. Each component type has associated with it a request publish/subscribe topic and a reply publish/subscribe topic. Each distributed application component subscribes to its request and reply topics and can publish to request and reply topics of other component types. By utilizing callback objects, the middleware wrapper facilitates the transmission of a request and replies between distributed application components by posting the requests or replies on an appropriate request or reply publish/subscribe topic.

25 Claims, 5 Drawing Sheets

IMPLEMENTING REQUEST/REPLY PROGRAMMING SEMANTICS USING PUBLISH/SUBSCRIBE MIDDLEWARE

TECHNICAL FIELD

This application claims the benefit of priority under 35 U.S.C. §119(e) from U.S. Provisional Application No. 60/414,369, entitled "Implementing Request/Reply Programming Semantics Using Publish/Subscribe Middleware," filed Sep. 30, 2002, which disclosure is incorporated herein by reference.

BACKGROUND

1. Field of Invention

The present invention relates to distributed computing, and particularly to software tools for architecting and implementing distributed computing systems.

2. Description of Related Art

Software that sits between two or more types of software and translates information between them is generally referred to as "middleware." Middleware covers a vast range of software and is typically situated between an application and an operating system, a network operating system, or a database management system. Examples of middleware include object-oriented programming code based on a Common Object Request Broker Architecture (CORBA™); software implemented according to a Distributed Computing Environment (DCE) industry-standard; JAVA™ Remote Method Invocation (JAVA™ RMI) programming code; and an application programming interface (API) based on ENTERPRISE JAVABEANS™ (EJB™). COBRA is a registered trademark of Object Management Group, Inc. JAVA™, ENTERPRISE JAVABEANS™ and EJB™, are registered trademarks of Sun Microsystems, Inc.

Middleware can serve as a tool that is employed to build distributed computing systems. For example, distributed computing middleware facilitates application components, i.e., programs, on different computers to talk to one another. One widely used technique for allowing one program to call a second program on a remote system is to implement remote procedure call (RPC) middleware. RPC middleware facilitates instructing a second program to perform a task requested by the first program and returning any results of that task to the first program.

One common method of developing distributed systems is to employ operating system APIs, or sockets API, for facilitating communications among distributed application components. Sockets API is an application programming interface, i.e., set of routines, to create and use sockets implemented by the operating system for client/server networking. A socket is an identifier for a particular service at a particular node on a network. Winsock, short for WINDOWS™ Sockets, is an API that provides a Transmission Control Protocol/Internet Protocol (TCP/IP) interface under MICROSOFT WINDOWS™, WINDOWS™ and MICROSOFT WINDOWS™ are registered trademarks of Microsoft Corporation.

FIG. 1 illustrates a conventional architecture 100 of a distributed application residing among two computing devices 110 and 120, and utilizing sockets API. In this example, the distributed application comprises of a first application component 112 residing on computing device 110 and a second application component 122 residing on computing device 120. Application components 112 and 122 are computer programs, or sets of instructions that a computer or other device executes to perform one or more actions. Computing devices 110 and 120 employ respective operating systems 114 or 124, and communicate with one another via a network connection 130, implementation of which is apparent to one of ordinary skill in the art. Application components 112 and 122 are designed to utilize respective sockets API 116 or 126. Jagged lines illustrate that the API serves as an additional pseudo-software layer to interface adjacent software layers, e.g., application and operating system (OS) software layers in the present figure.

If application component 112 at computing device 110 wants to talk to application component 122 at computing device 120 via network connection 130, it first calls its operating system 114 through its sockets API 116. Operating system 114 then communicates via a communication protocol, typically TCP/IP, with operating system 124, which in turn calls application software 122 through its sockets API 126. If application component 122 wants to talk to application component 112, the reverse path/process is employed.

Sockets API is used for a variety of applications ranging from, for example, email systems to real time on-line gaming. In order to support such varied applications, sockets API must include many options and parameters, and allow for many different communication semantics. For instance, sockets API must support both connection oriented TCP semantics and connectionless User Datagram Protocol (UDP) semantics. All these options and parameters make the API complex. Considerable training and expertise is required in order for a programmer to use sockets API to implement systems that use the architecture of FIG. 1.

Distributed computing middleware manages inter-machine communication for the components of a distributed application and presents its own API. In essence, each application component of the distributed application talks to the middleware via a middleware API and the middleware then talks to the operating system often via sockets API. Middleware translates the information it carries from its own programming semantics to the programming semantics used by sockets API. Typically, the distributed computing middleware semantics are easier to use than those of sockets API. By using a simpler, more focused API, distributed computing projects can be completed quicker with higher quality by a smaller and less highly skilled team.

FIG. 2 illustrates a conventional architecture 200 of a typical distributed application residing among computing devices 110 and 120, and utilizing distributed computing middleware and sockets API. Particularly, application components 112 and 122 are designed to utilize respective middleware 212 or 214 residing at respective computing devices 110 or 120. Thus, a separate middleware layer is provided between the application and operating system layers. Middleware 212 or 222 each presents a middleware API 214 or 224 to respective application component 112 or 122. If application component 112 at computing device 110 wants to talk to application component 122 at computing device 120 via network connection 130, it first calls middleware 212 via the middleware API 214. After performing any necessary translation of the information being carried, middleware 212 in turn calls the operating system 114 through its socket API 116. Operating system 114 then communicates via TCP/IP with operating system 124, which in turn calls middleware 222 through its socket API 126. Middleware 222 then calls application component 122 through middleware API 224. If application component 122 wants to talk to application component 112, the reverse path/process is employed.

JAVA™ Message Service (JMS) is a standard API implemented by several distributed computing middleware vendors. JMS employs a publish/subscribe API for coordinating the efficient delivery of information. Publish/subscribe features topics, publishers, and subscribers. Conceptually, topics are pipes that carry messages. Publishers and subscribers are sets of instructions that put information into the pipe, i.e., topic, and take it out. Topics exist independently of publishers and subscribers, however all three are needed to make the communications information flow. In a distributed computing system, an application component can publish to a topic and/or subscribe to a topic.

A message published to a topic is delivered asynchronously to all the subscribers of the topic. JMS has its own message format featuring a header and a payload. The header comprises a set of name/value pairs, or header properties, some of which are defined by the publish/subscribe API and some defined by the application. Two header properties of particular importance are "message ID" and "correlation ID." The message ID is a unique identification that is assigned by the middleware to every message it processes. When one message is related in some way to another, the application can set the correlation ID header property to equal the message ID of the related message. The payload is never examined by the middleware.

When a JMS publish/subscribe client subscribes to receive messages from a topic it specifies a message filter. The filter is a conditional expression that analyzes message header values. When a message is published on a topic it is delivered to every subscriber of the topic who's filter is satisfied by the messages header properties. For example, a chatroom application component might use a filter like this:

((targetUser='phil') OR (targetUser='all')) AND (sendingUser NOT IN ('darrell', 'jeff'))

This filter would have the effect of allowing receipt of private messages directed to 'phil' or messages directed to the entire chatroom except when these messages were sent by the ignored users 'darrell' or 'jeff'.

Request/reply programming is a cross between publish/subscribe and the very popular RPC model. With RPC as previously mentioned, a sender invokes a procedure on a remote application component and the remote component "returns" a response. Request/reply has several advantages over RPC. For example, request/reply supports the sending of messages to multiple receivers. Moreover, request/reply is asynchronous and is therefore better suited to situations where replies may take a long time to arrive or where the network, sender, or receiver may fail. Like publish/subscribe, but unlike RPC, request/reply communications can be conveniently attempted in situations where the existence, location, or number of receivers is not known by the sender. No conventional middleware directly supports simple request/reply semantics. Developers who wish to employ a request/reply design pattern must either do all their own communications programming utilizing sockets API as in FIG. 1 or use unsuitable middleware APIs. Such an implementation is complex and time consuming to design even for a highly skilled developer.

SUMMARY OF THE INVENTION

The present invention overcomes these and other deficiencies of the related art by providing a request/reply middleware wrapper that transposes an application's request/reply communications into publish/subscribe communications implemented by publish/subscribe middleware.

The request/reply programming semantics presented herein are simpler than publish/subscribe programming semantics. By using a middleware wrapper that implements request/reply programming semantics, an application component can send a message to all components of a particular type by specifying a target type or it can send a message to a single component by specifying a target component type and name. When a message is sent, the sender can indicate to the request/reply middleware wrapper that it expects to receive replies. In order to receive replies, the sender supplies a callback object, which the middleware wrapper can call to process the reply. Any replies received after a timeout value has expired are not passed to the listener object, and hence to the sender.

In an embodiment of the invention, a method for facilitating communications between components of a distributed application comprises the steps of: receiving a request from a first distributed application component directed to a second distributed application component; and publishing the request on a publish/subscribe request topic identified by a component type of the second distributed application component. If a reply is expected in response to the request, a subscription is created on a publish/subscribe reply topic identified by the component type of the first application component. In order to receive requests from other distributed application components, a subscription is created on a publish/subscribe request topic identified by the component type of the first application component. If a reply to the received request is necessitated, the reply is published on a second publish/subscribe reply topic identified by the component type of requesting distributed application component.

In another embodiment of the invention, a system for facilitating request/reply communications among components of a distributed application comprises: a publish/subscribe request topic for every type of distributed application component; a publish/subscribe reply topic for every type of distributed application component; and for every distributed application component, a publisher on each publish/subscribe request topic within a portion of the publish/subscribe request topics; a publisher on each publish/subscribe request topic within a portion of the publish/subscribe reply topics; a subscription on the publish/subscribe request topic pertaining to the component type of the distributed application component; and a subscription on the publish/subscribe reply topic pertaining to the component type of the distributed application component. The portion of the publish/subscribe request topics includes all publish/subscribe request topics associated with the types of distributed application components that receive requests from the distributed application component. Similarly, the portion of the publish/subscribe reply topics includes all publish/subscribe reply topics associated with the types of distributed application components that receive replies from the distributed application component. Callback objects are provided to facilitate delivery of requests and replies between the distributed application components and the publishers or subscriptions. Moreover, routing logic is employed to route a request or reply to a particular callback object.

An advantage of the invention is its relative ease of implementation. Particularly, ease of implementation arises from the fact that a request/reply middleware wrapper is built around, i.e., utilizes or employs, aspects of existing publish/subscribe middleware. Accordingly, a relatively simple distributed programming semantic is provided, which lets existing middleware perform the actual work of managing the communications across the network so that distributed computing projects are completed quickly with higher quality by a smaller and less highly skilled team.

Another advantage of the invention is the simplicity and utility of the request/reply semantics. Other middleware, in order to justify it's cost of implementation, must provide a very rich API that can be used in many different applications. Request/reply is less general, but much easier to use than other APIs. Because it is implemented using publish/subscribe middleware, the cost of implementation, and therefore the number of users needed to justify the cost, is reduced.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
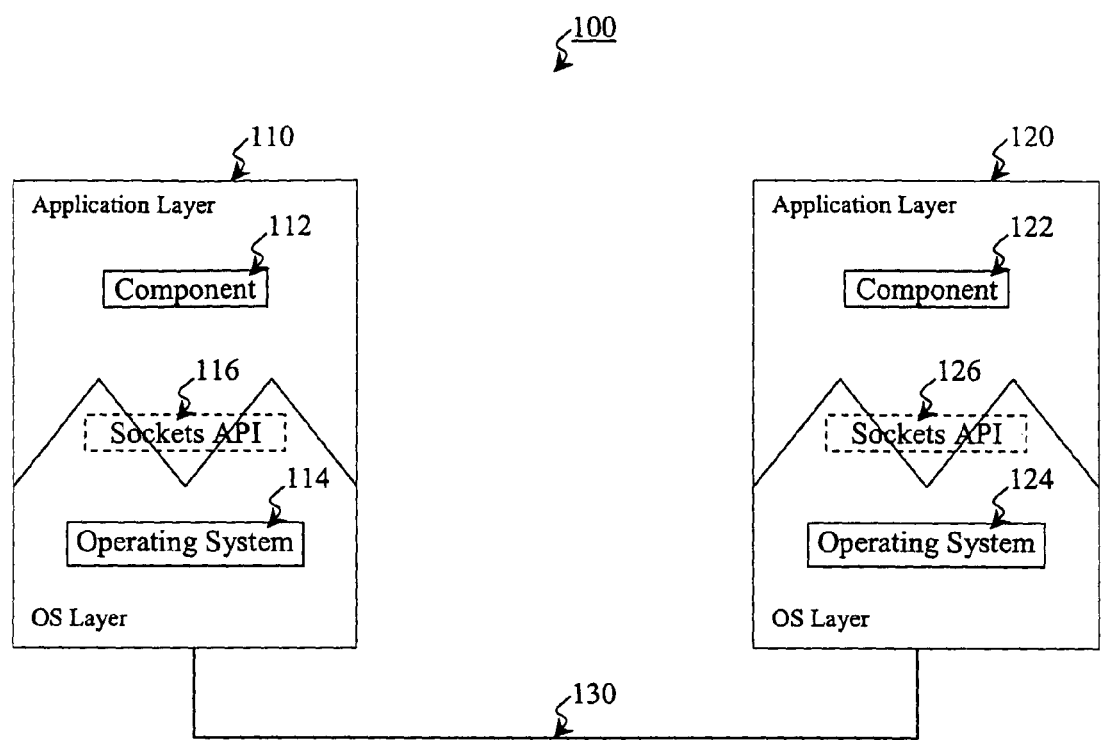
FIG. 1 illustrates a conventional distributed application architecture utilizing sockets API.
Figure 2:
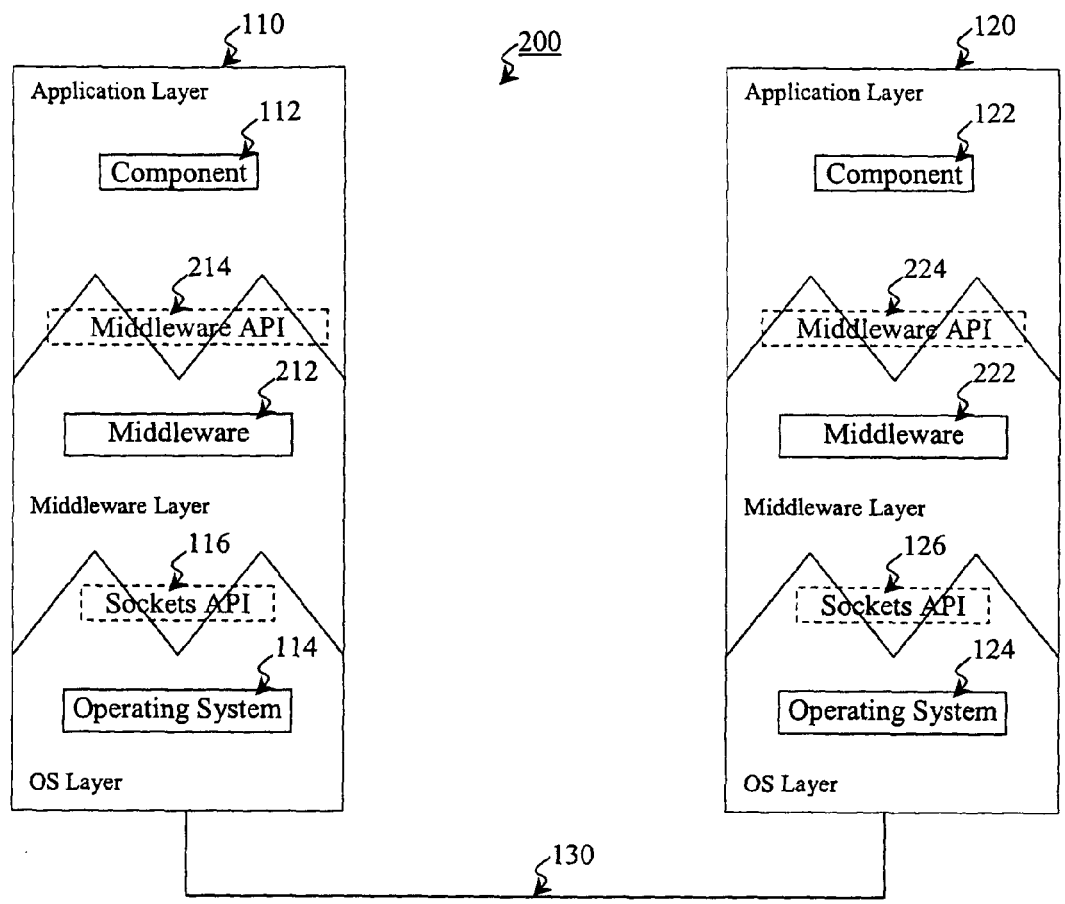
FIG. 2 illustrates a conventional architecture of a middleware-based distributed application.
Figure 3:
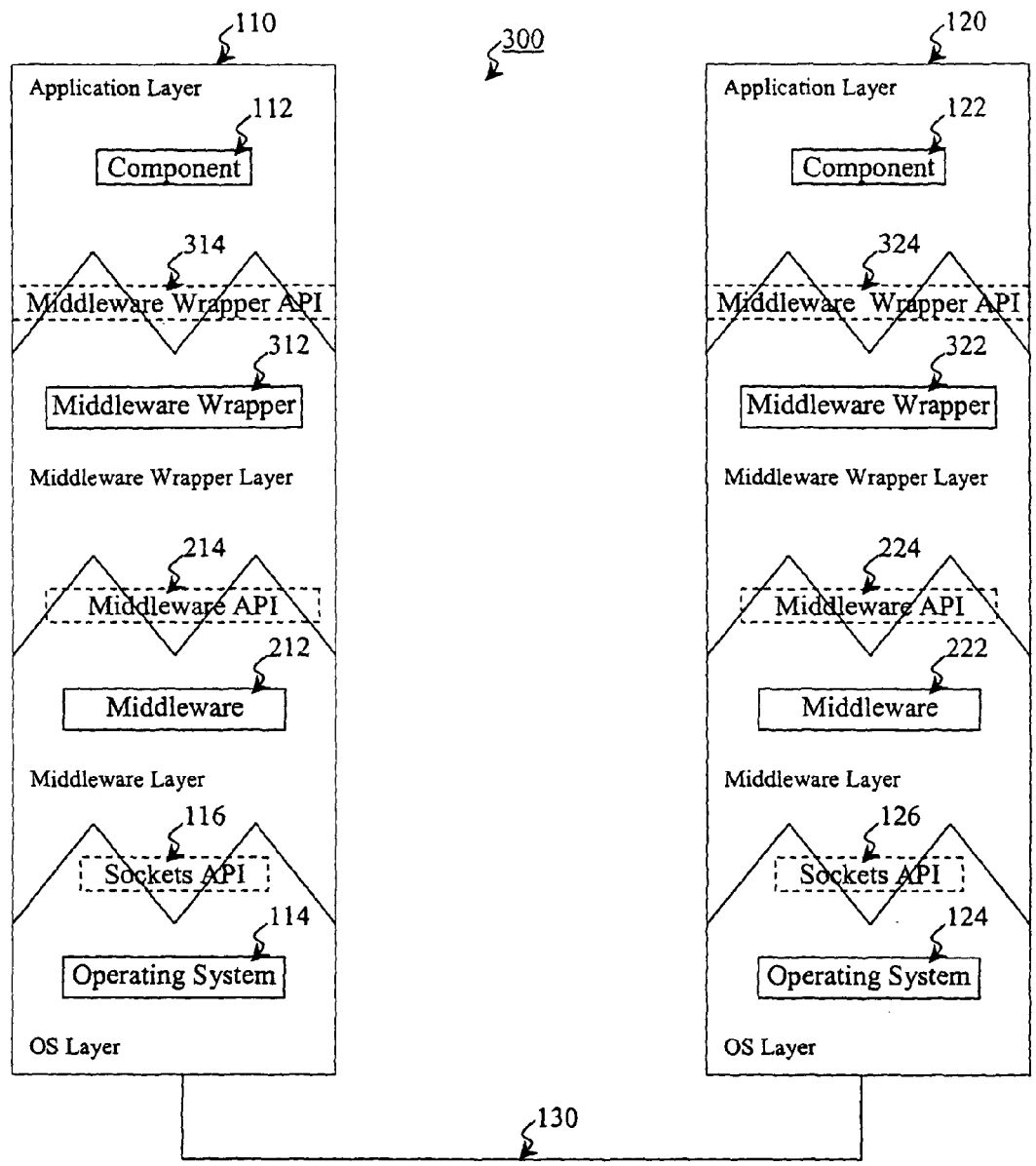
FIG. 3 illustrates a distributed application architecture implementing a request/reply middleware wrapper according to an embodiment of the invention.
Figure 4:
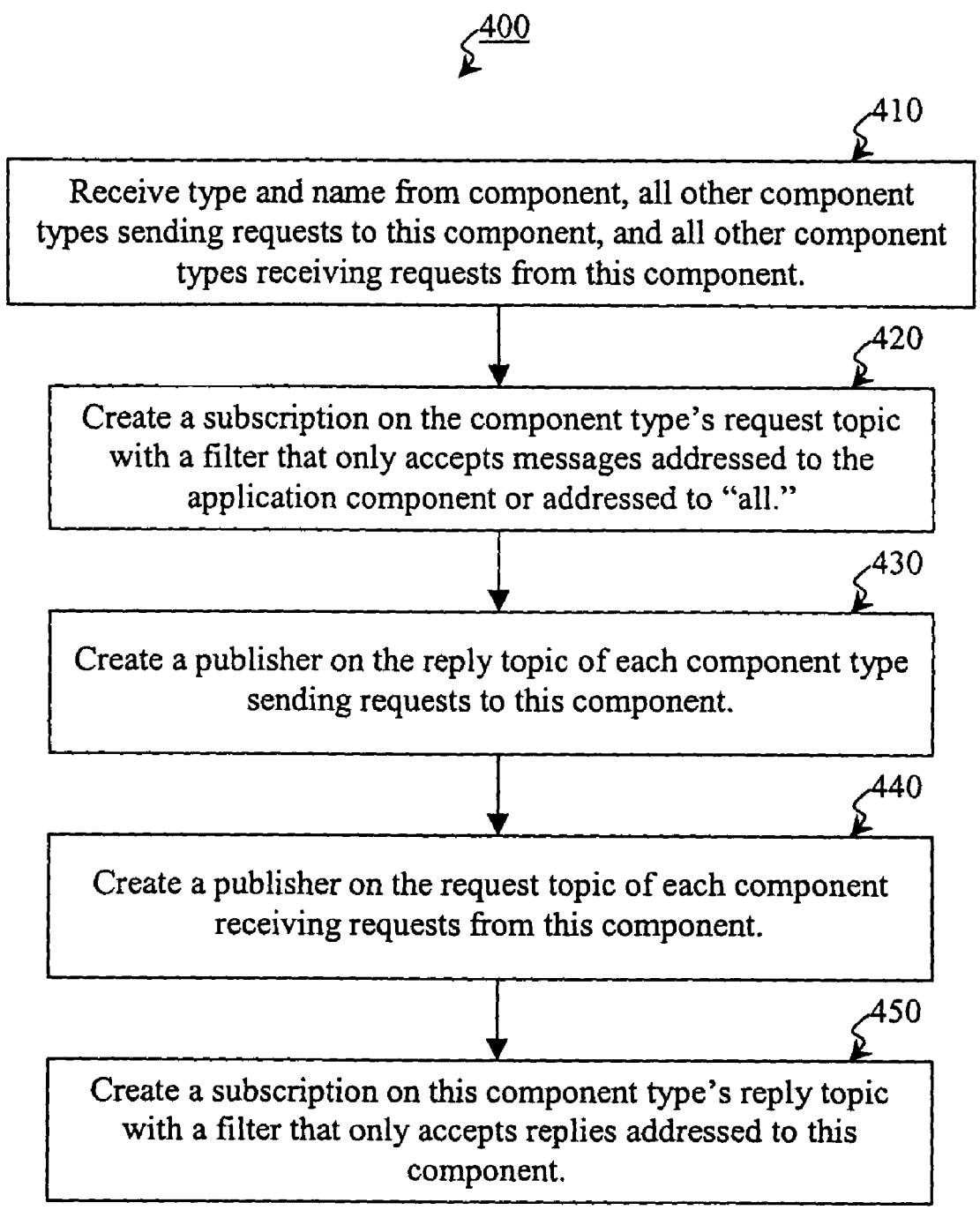
FIG. 4 illustrates an application component registration process according to an embodiment of the invention.
Figure 5:
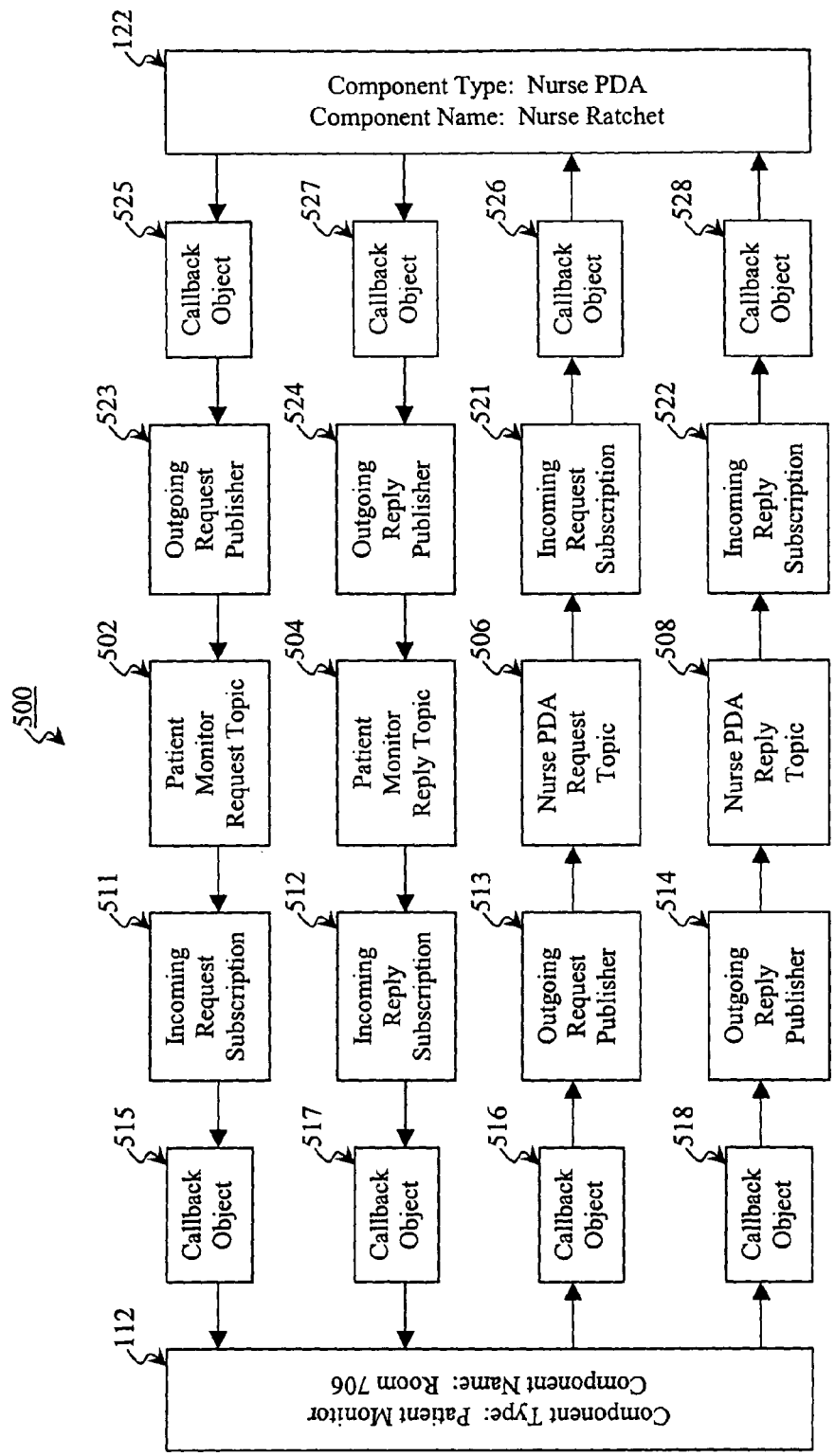
FIG. 5 illustrates a request/reply middleware wrapper system according to an embodiment of the invention.

Preferred embodiments of the present invention and their advantages may be understood by referring to FIGS. 3-5, wherein like reference numerals refer to like elements, and are described in the context of a request/reply middleware wrapper that transposes request/reply communications into publish/subscribe middleware semantics. The inventive concept provides a middleware wrapper software layer that allows application components implementing request/reply semantics to communicate with each other through aspects of publish/subscribe middleware.

FIG. 3 illustrates a distributed application architecture 300 implementing a request/reply middleware wrapper according to a preferred embodiment of the invention. The use of the term "wrapper" denotes that one programming semantic, request/reply in the present case, is built, i.e., wrapped, around existing publish/subscribe middleware. As such, an additional software layer, herein referred to as the middleware wrapper layer, is provided between the application layer and the middleware layer at each computing device executing an application component of the distributed application. In a two component system, which is presently illustrated in order to simplify the discussion as a distributed application may comprise tens or hundreds of components, the middleware wrapper layer is provided by a middleware wrapper 312 or 322 at respective computing devices 110 or 120. Middleware wrappers 312 and 322 each comprise a set of routines, which implement the processes described herein, to translate request/reply programming semantics to publish/subscribe semantics implemented by middleware 212 and 222. Middleware wrappers 312 and 322 present respective middleware wrappers API 314 or 324 to respective programs 112 and 122. Any call by an application component to middleware wrapper 312 or 322 is facilitated through respective middleware wrappers API 314 or 324.

In order to facilitate a way of describing a distributed computing system as a set of components where instances of various components run on different computers in the system, every application component is referenced according to a two-tuple naming scheme. In an embodiment of the invention, the two-tuple naming scheme references each application component by its component type and component name. The component type is a categorical identifier based on, for example, the kind or sort of component. In an exemplary information distribution embodiment, the component type can be identified as a console, database, network monitor, event correlator, etc. In another exemplary embodiment presented in the context of a bank, the component type can be identified as a teller terminal, automated teller machine (ATM), check clearing machine, etc. The component name is preferably an IP address or some other unique identifier of the computing device that the application component resides on.

If application component 112 running on computing device 110 wants to send a request to application component 122, which is a database for example, running on computing device 120 having the IP address 192.168.22.187, component 112 generates and sends a request with component type identified as "DATABASE" and component name identified as "192.168.22.187" to the middleware wrapper 312, and then waits for a reply. There are two exemplary ways that component 112 knows a database resides at 192.168.22.187. For instance, component 112 can send a "send me your component name" request to all components of type DATABASE in which an appropriate informative response is obtained, or component 112 can obtain the pertinent information from a lightweight directory access protocol (LDAP) registry. Nevertheless, the middleware wrapper 312 views the component types and component names as mere strings, i.e., middleware wrapper 312 performs simple string matching when analyzing the component types and names. This two-tuple naming scheme is particularly useful because it facilitates broadcasting to a group of components based on type, e.g., all databases, or sending to a single application component. Because the convention of using IP addresses as component names breaks down if two or more instances of one component type reside on a single computing device, a modified 1P address can be used as the component name. For example, two databases located on computing device are designated by the names "192.168.22.187.PRIMARY" and "192.168.22.187.SECONDARY". The general point is that the distributed application must insure that, each component has a name that is unique among all instances of that component type. In an alternative embodiment, each application component is identified by two parameters other than component type and name.

Two publish/subscribe topics are associated with each type of application component. One topic is for requests directed to that component type and another topic is for replies directed to that component type. In an embodiment of the invention, the title of each topic comprises the component type and the type of messages, e.g., request or reply, it will handle. For example, for the component type "database," the request topic is referred to as "database.request" and the reply topic is referred to as "database.reply." In an alternative embodiment, the request topic is referenced by the component type only. As such, the request topic is referred to as "database" and the reply topic is referred to as "database.reply." The important point is that two topics are associated with each component type and each of the two topics is delineated by the type of message, e.g., request or reply, that the topic handles. The semantics for creating topics may vary depending on the particulars of the publish/subscribe middleware being used. For example, topics can be created by middleware wrappers 312 or 322 when they initialize or when components 112 or 122 register upon start-up. In an alternative embodiment of the invention, the publish/subscribe topics are configured by a system administrator before the middleware wrappers are initialized.

In order to send and receive requests and replies, each application component must first register with its respective middleware wrapper. FIG. 4 illustrates an application component registration process 400 implemented by the middleware wrapper 312 or 322 for creating publishers, subscriptions, and topics according to an embodiment of the invention. When an application component first initializes, i.e., announces its presence to the network on start-up, its middleware wrapper receives (step 410) from the application component the following information: component type, component name, all the component types it will be receiving requests or replies from, and all the component types it will be sending requests or replies to. For an application component to receive requests, the middleware wrapper creates (step 420) a publish/subscribe subscription on that application component's type request topic with an optional filter that only accepts incoming requests addressed to that application component or addressed to "all". For the application component to send replies in response to received requests, the middleware wrapper further creates (step 430) a publish/subscribe publisher on the reply topic of each application component type that this application component will receive requests from. For an application component to send requests, the middleware wrapper creates (step 440) a publish/subscribe publisher on the request topic of each application component type that this application component will send requests to. For an application component to receive replies, the middleware wrapper creates (step 450) a publish/subscribe subscription on that application component's type reply topic with an optional filter that only accepts incoming requests addressed to that application component. Once registered, the component can send or receive requests and replies. Moreover, the registration process 400 is transparent to the application component.

When a message, i.e., request or reply, is sent, the message sender's component type and component name are added to the header of the message along with the message receiver's component name. The receiver's component type is indicated by the topic the message is published on. The header of the message therefore comprises sender component type, sender component name, and receiver component name and does not contain receiver component type because that can be inferred from the topic the message is flowing on. If a request is meant for all instances of a particular component type than the receiver name is set to "all".

In an embodiment of the invention, an application component implements two middleware wrapper registration APIs. For example, the application component sends a "register sender" command to the middleware wrapper and passes a target (receiving) component type and a target component name. If the target component name is omitted, then the middleware wrapper understands that the application component wishes to broadcast to all component names of that component type. For each "register sender" command received from the application component, the middleware wrapper supplies a callback object to the application component it can utilize to send to a specified target. Callback objects are utilized to facilitate the transferring of replies and requests between application components 112 or 122 and respective middleware wrappers 312 or 322. A callback object comprises a memory address or some other reference, depending on the nomenclature of the programming language implemented, to enable the band off of messages to and from application components 112 or 122. For each component type that requests are received from, the application component sends a "register receiver" command to the middleware wrapper. In addition, the application component passes a callback object where it wants the middleware wrapper to pass incoming requests coming from the given component type. When this is all done, the middleware wrapper has a set of callback objects to route incoming requests to and a set of callback objects routing outgoing requests from. When each callback object is registered, the middleware wrapper notes the specific publisher or subscriber it is associated with. Preferably, a single registration call is placed from the application component to register and pass a data structure with all the outgoing targets, incoming senders, and a callback object for each incoming sender. The middleware wrapper then returns the data structure with a callback object for each outgoing target added.

FIG. 5 illustrates a request/reply middleware wrapper system 500 implementing according to the distributing computer architecture 300 embodied in FIG. 3. In order to better illustrate the inventive concept, middleware wrapper system 500 is described in the context of a hospital setting wherein application component 112 is a patient monitor and application component 122 is a nurse personal digital assistant (PDA). In an exemplary configuration, application component 112 is identified by the component type "Patient Monitor" and the component name "Room 706." Application component 122 is identified by the component type "Nurse PDA" and the component name "Nurse Ratchet."

Middleware wrapper system 500 comprises four topics: patient monitor request topic 502, patient monitor replies topic 504, nurse PDA requests topic 506, and nurse PDA replies topic 508. One of ordinary skill in the art recognizes that system 500 can be expanded to comprise more than two application components. For example in most typical real-world applications, several hundred application components can be present. As such, the total number of topics necessary to implement the inventive concept is double the number of component types.

During registration, application component 112 instructs middleware wrapper 312 that it wants to send requests and replies to Nurse PDA component types (e.g. "Nurse Ratchet" or "all") and to receive requests and replies from Nurse PDA component types, and supplies middleware wrapper 312 with a callback where it will receive requests from the Nurse PDAs. With that information, middleware wrapper 312 creates incoming request subscription 511 on patient monitor request topic 502, incoming reply subscription 512 on patient monitor reply topic 504, outgoing request publisher 513 on nurse PDA request topic 506, and outgoing reply publisher 514 on nurse PDA reply topic 508. Incoming request subscriber Sills created with a filter that only accepts messages where the target component name is "Room 706" or "all". Incoming reply subscription 512 is constructed with a filter that only accepts replies intended for "Room 706".

Application component 112 further supplies a callback object 515 to middleware wrapper 312 to hand off incoming requests to the application component 112. Middleware wrapper 312 notes the association between callback object 515 and subscription 511. Middleware wrapper 312 provides application component 112 with a callback object 516 associated with publisher 513 that the application component 112 can invoke to send requests. Each time the callback object 516 is employed to send a request, the application component 112 supplies a callback object 517 associated subscription 512 in order for middleware wrapper 312 to hand off any reply to that request back to the application component 112. Similarly, each time middleware wrapper 312 passes a request to application component 112 through callback object 515, middleware wrapper supplies a callback object 518 associated publisher 514 to application component 112 in order to return a reply in response to the received request. In other words, handing off a request in either direction entails supplying a callback object that can be invoked to handle the reply.

Similarly during the registration of application component 122, application component 122 instructs middleware wrapper 322 that it wants to send and receive requests and replies to and from patient monitor component types (e.g. "Room 706" or "all"), and supplies middleware wrapper 322 with a callback object where it will receive requests from the patient monitors. With that information, middleware wrapper 322 creates incoming request subscription 521 on nurse PDA request topic 506, incoming reply subscription 522 on nurse PDA reply topic 508, outgoing request publisher 523 on patient monitor request topic 502, and outgoing reply publisher 524 on patient monitor reply topic 504. Incoming request subscriber 521 is created with a filter that only accepts messages where the target component name is "Nurse Ratchet" or "all". Incoming reply subscription 522 is constructed with a filter that only accepts replies intended for "Nurse Ratchet". Callback objects 525, 526, 527, and 528 associated with application component 122 and respective publishers 523 and 524, and subscriptions 521 and 522 are provided in an analogous manner to that implemented for application component 112.

For an application component to send requests and receive replies, the middleware wrappers 312 and 322 provide routing logic to route each reply to the correct callback object. One implementation employs a routing table, i.e., hash table, that is hashed by request message IDs. Each entry contains the callback object associated with the request. When a reply is received, the middleware wrapper 312 or 322 uses the reply's correlation ID to fetch the correct callback object from the table. The reply is then passed to the callback object and hence to the appropriate application component.

In operation, application component (patient monitor_room 706) 112 may send a request to application component 122 (nurse PDA_nurse Ratchet). To do so, a request message is formed by the middleware wrapper 312 with a header comprising "Patient Monitor" as the sender component type, "Room 706" as the sender component name, and a receiver component name designated as "Nurse Ratchet." Alternatively, if the request was directed to all nurse PDAs, e.g., if more than one nurse PDA existed within system 500, the receiver component name would be set to "all". As noted above, the choice of whether an outgoing request is sent to a particular component instance or "all" is made by the sending component when it registers. The header does not comprise a receiver component type as that is given by the particular topic the message is routed through. The payload of the request comprises the instructions or data for application component to execute or interpret. Once the request is formed, application component 112 sends the request and a callback object 517 to middleware wrapper 312 via the callback object 516. Middleware wrapper 312 sends the request to request publisher 513, which publishes the request on nurse PDA request topic 506. Request subscription 523 identifies that the recipient of the new request published at topic 506 is "Nurse Ratchet" corresponding to application component 122, and accordingly forwards the request to middleware wrapper 322. When a request is received by middleware wrapper 322 by way of subscription 521, the request is handed off to application component 122 through callback object 526. As part of the hand off, middleware wrapper 322 provides the callback object 527.

Application component 122 generates a reply message if necessary, i.e., if the request instructions necessitated a reply. This reply message features a header comprising "Nurse PDA" as the sender component type, "Nurse Ratchet" as the sender component name, and a receiver component name designated as "Room 706." Once application component 122 provides a reply through callback object 527, middleware wrapper 322 sets the correlation ID in the reply's header to the message ID of the original request and publishes the reply through publisher 524, which publishes the reply on patient monitor reply topic 504. Reply subscription 512 identifies that the recipient of the new reply published at topic 504 is "Room 706" corresponding to application component 112. When a reply arrives through subscription 512, middleware wrapper 312 uses the correlation ID in the message header to determine which request is being replied to and hands off the reply to application component 112 using the callback object 517.

In an embodiment of the invention, an application component can supply a timeout value to the middleware wrapper to indicate a duration that component will receive replies in response to a sent request. Replies received after the timeout value has expired are not to be delivered. The middleware wrapper's reply routing table is culled periodically to remove entries for requests that have timed out.

The present invention provides a very simple way to develop distributed application components. A very simple API is provided and it is believed that inexperienced programmers can begin developing distributed systems using the request/reply semantics describe herein much faster than with any other conventional middleware API.

Other embodiments and uses of the invention will be apparent to those skilled in the art from consideration of the specification and practice of the invention disclosed herein. Although the invention has been particularly shown and described with reference to several preferred embodiments thereof, it will be understood by those skilled in the art that various changes in form and details may be made therein without departing from the spirit and scope of the invention as defined in the appended claims.

I claim:

1. A method for facilitating communications between components of a distributed application comprising the steps of:
   receiving a request by a middleware program from a first distributed application component, wherein a second distributed application component is identified in said request as a recipient of said request;
   identifying by the middleware program a publish/subscribe topic by identifying a first property of said second distributed application component;
   sending the request by the middleware program to a publisher associated with the first publish/subscribe topic;
   publishing by the publisher said request on the first publish/subscribe request topic; and
   in response to said publishing said request on the first publish/subscribe topic: sending the message to the second distributed application component,
   wherein the distributed application, the middleware program, the publisher and the publish/subscribe topic, are embodied in communicating computing devices.

2. The method of claim 1, wherein said first property is a type of said second distributed application component.

3. The method of claim 2, wherein said recipient is identified by a second property of said second distributed application component included within said request.

4. The method of claim 3, wherein said second property is a unique identifier of said second distributed application component.

5. The method of claim 2, further comprising the steps of:
subscribing by the middleware program to a first publish/subscribe reply topic, wherein said first publish/subscribe reply topic is identified by a type of said first distributed application component;
forwarding by the middleware program a reply posted on said first publish/subscribe reply topic to said first distributed application component.

6. The method of claim 5, wherein said reply is generated by said second distributed application component in response to said request.

7. The method of claim 1, further comprising the steps of:
subscribing by the middleware program to a second publish/subscribe request topic, wherein said second publish/subscribe request topic is identified by a type of said first distributed application component;
forwarding by the middleware program a request posted on said second publish/subscribe request topic to said first distributed application component, wherein said request is generated by a third distributed application component;
receiving by the middleware program a reply from said first distributed application component, wherein a recipient of said reply is said third distributed application component; and
publishing by the middleware program said reply on a second publish/subscribe reply topic, wherein said second publish/subscribe reply topic is identified by a type of said third distributed application component.

8. The method of claim 7, wherein said second and third distributed application components are the same distributed application component.

9. The method of claim 7, further comprising the step of, prior to forwarding said request posted on said second publish/subscribe request topic,
identifying by the middleware program that a recipient of said request posted on said second publish/subscribe request topic is either said first distributed application component or all distributed application components.

10. The method of claim 7, further comprising the step of, sending by the middleware program a callback object to said first distributed application component with said request posted on said second publish/subscribe request topic.

11. The method of claim 1, further comprising the step of, registering by the middleware program said first distributed application component prior to receiving said request, wherein said step of registering comprises:
receiving by the middleware program a type of said first distributed application component, a name of said first distributed application component, a list of all other types of distributed application components that will be sending or receiving requests or replies to/from said first distributed application component.

12. The method of claim 11, wherein said step of registering further comprises:
receiving by the middleware program a callback object, wherein said callback object directs requests from other distributed application components to said first distributed application component.

13. The method of claim 12, further comprising the step of, invoking by the middleware program said callback object to deliver said request to said first distributed application component.

14. The method of claim 11, wherein said step of registering further comprises:
sending by the middleware program a callback object to said first distributed application component.

15. The method of claim 11, wherein said step of registering further comprises:
creating by the middleware program a publisher for a publish/subscribe request topic of each of said other type of distributed application component receiving a request from said first distributed application component;
creating by the middleware program a publisher for a publish/subscribe reply topic of each of said other type of distributed application component types receiving a reply from said first distributed application component;
creating by the middleware program a subscription for a publish/subscribe request topic of said type of said first distributed application component; and
creating by the middleware program a subscription for a publish/subscribe reply topic of said type of said first distributed application component.

16. The method of claim 15, wherein said subscription for a publish/subscribe request topic of said type of said first distributed application component includes a filter that only accepts requests addressed to said first distributed application component or all distributed application components.

17. The method of claim 15, wherein said subscription for a publish/subscribe reply topic of said type of said first distributed application component includes a filter that only accepts replies addressed to said first distributed application component.

18. The method of claim 1, wherein said request comprises one or more instructions directed toward a task to be performed by said second distributed application component.

19. The method of claim 1, wherein the middleware program is a middleware wrapper.

20. A computer system for communicating messages between components of a distributed application, the computer system comprising a plurality of communicating computing devices embodied with computer logic that:
receives a message formulated according to request/reply semantics from a first distributed application component, wherein the message identifies a second distributed application component;
in response to receiving the message:
publishes the message to a publish/subscribe topic; and
in response to publishing the message to the topic:
sends the message to the second distributed application component.

21. The computer system of claim 20, wherein said message is a request or reply.

22. The computer system of claim 20, wherein the publish/subscribe topic is identified based on a property of the second distributed application component.

23. A method of communicating messages between components of a distributed application, the method implemented in a computer system comprising a plurality of communicating computing devices, the method comprising:
receiving in the computer system a message formulated according to request/reply semantics from a first distributed application component, wherein the message identifies a second distributed application component;

in response to receiving the message:
- publishing in the computer system the message to a publish/subscribe topic; and in response to said publishing the message to the topic:
- sending the message to the second distributed application component.

24. The method of claim 23, wherein said message is a request or reply.

25. The method of claim 23, wherein the publish/subscribe topic is identified based on a property of the second distributed application component.

\* \* \* \* \*